United States Patent [19]

Sakuno

[11] Patent Number: 5,618,360

[45] Date of Patent: Apr. 8, 1997

[54] PNEUMATIC TIRE INCLUDING PITCHES

[75] Inventor: Hiroaki Sakuno, Kobe, Japan

[73] Assignee: Sumitomo Rubber Industries, Ltd., Hyogo-ken, Japan

[21] Appl. No.: 353,354

[22] Filed: Dec. 2, 1994

[30] Foreign Application Priority Data

Dec. 22, 1993 [JP] Japan .................................. 5-346668

[51] Int. Cl.⁶ ................................................ B60C 113/00
[52] U.S. Cl. ..................................................... 152/209 R
[58] Field of Search ........................... 152/209 R, 209 D

[56] References Cited

U.S. PATENT DOCUMENTS

| | | | |
|---|---|---|---|
| 3,023,798 | 3/1962 | Moore et al. | 152/209 R |
| 3,664,402 | 5/1972 | Montagne | 152/209 R |
| 3,674,076 | 7/1972 | Dailey | 152/209 R |
| 4,503,898 | 3/1985 | Hitzky | 152/209 R |
| 4,796,683 | 1/1989 | Kawabata et al. | 152/209 R |
| 5,062,461 | 11/1991 | Noguchi | 152/209 R |
| 5,178,698 | 1/1993 | Shibata | 152/209 R |
| 5,205,879 | 4/1993 | Seitz et al. | 152/209 R |

FOREIGN PATENT DOCUMENTS

| | | |
|---|---|---|
| 367557 | 5/1990 | European Pat. Off. . |
| 495619 | 7/1992 | European Pat. Off. . |
| 520755 | 12/1992 | European Pat. Off. . |
| 3609248 | 10/1986 | Germany . |
| 3727050 | 2/1989 | Germany . |
| 3824897 | 1/1990 | Germany . |
| 4107051 | 9/1992 | Germany . |
| 171306 | 7/1990 | Japan . |
| 70605 | 3/1991 | Japan . |
| 19203 | 1/1992 | Japan . |
| 146804 | 5/1992 | Japan . |

*Primary Examiner*—Steven D. Maki
*Attorney, Agent, or Firm*—Birch, Stewart, Kolasch & Birch, LLP

[57] ABSTRACT

A pneumatic tire having a tread portion capable of reducing the running noise. The tread portion is provided with a circumferentially extending main groove and lateral grooves extending from the main groove towards one side thereof, the circumferential pitches of the lateral grooves including at least two different pitches. The width of the main groove at the groove top is substantially constant along its length, but the sectional area is changed along its length such that $$\{S(i+1)-S(i)\}/S(i)$$

is 0.5 to 1.5 times $$\{P(i+1)-P(i)\}/P(i)$$

wherein $S(i)$ is the sectional area in one pitch $P(i)$ and $S(i+1)$ is the sectional area in the next longer pitch $P(i+1)$.

4 Claims, 4 Drawing Sheets

PNEUMATIC TIRE INCLUDING PITCHES

The present invention relates to a pneumatic tire having an improved tread portion capable of reducing the running noise.

In recent years, as the expressway network is developed and the vehicle performance is remarkably improved, a block pattern and block-rib pattern, which include circumferentially extending straight or generally straight wide main grooves, are widely used for their superior drainage performance and road grip performance. As a tread pattern including blocks generates much noise when running on a well-paved roads at high speed, such tires are required to reduce their running noise.

During running, tread blocks repeatedly contact with the ground to generate impact sound. Also the tread blocks are repeatedly detached from the ground, and the blocks are vibrated. Further, lateral grooves connected with the main groove are changed in the volume, and pulsative sound is generated from the lateral grooves.

As a result, the air existing in the tubes formed between the ground and main grooves in the ground contacting patch, is excited by the above-mentioned impact sound, vibrations and pulsative air flow, and the air resonates at a certain frequency (about 800 to 1250 Hz) to generate so called air resonance noise.

If the depth of the main grooves is decreased, such a resonance noise can be reduced, but wet performance is greatly decreased.

It is therefore, an object of the present invention to provide a pneumatic tire in which, by decreasing the air resonance, the running noise of the tire is effectively reduced without sacrificing wet performance.

According to one aspect of the present invention, a pneumatic tire comprises a tread portion provided with with a main groove and lateral grooves to define a block type tread pattern or block-rib type tread pattern, the main groove extending continuously in the circumferential direction of the tire, the lateral grooves circumferentially spaced from each other and extending from the main groove to one side thereof to define circumferential pitches between the intersections with the main groove, the pitches including at least two different pitches, wherein the width of the main groove at the groove top is substantially constant along its length, but the sectional area of the main groove is changed along its length such that $\{S(i+1)-S(i)\}/S(i)$ is 0.5 to 1.5 times $\{P(i+1)-P(i)\}/P(i)$ wherein S(i) is the sectional area in one pitch P(i) and S(i+1) is the sectional area in the next longer pitch P(i+1).

Preferably, the depth of the main groove is set at a constant value along the length thereof.

Therefore, as the sectional area of the main groove is changed according to the pitch change of the lateral grooves, one of the factors determining the resonance mode is changed as the tire rotates. As a result, the resonance frequency is dispersed in a wide frequency range and the peak in the sound frequency spectrum becomes low. And a resonance hardly occurs. Therefore, the running noise is effectively reduced.

Further, as the depth is constant, if a tread wear is progressed, drainage and traction can be maintained, and degradation of the appearance of the tire can be prevented.

An embodiment of the present invention will now be described in detail in conjunction with the drawings.

Figure 1:
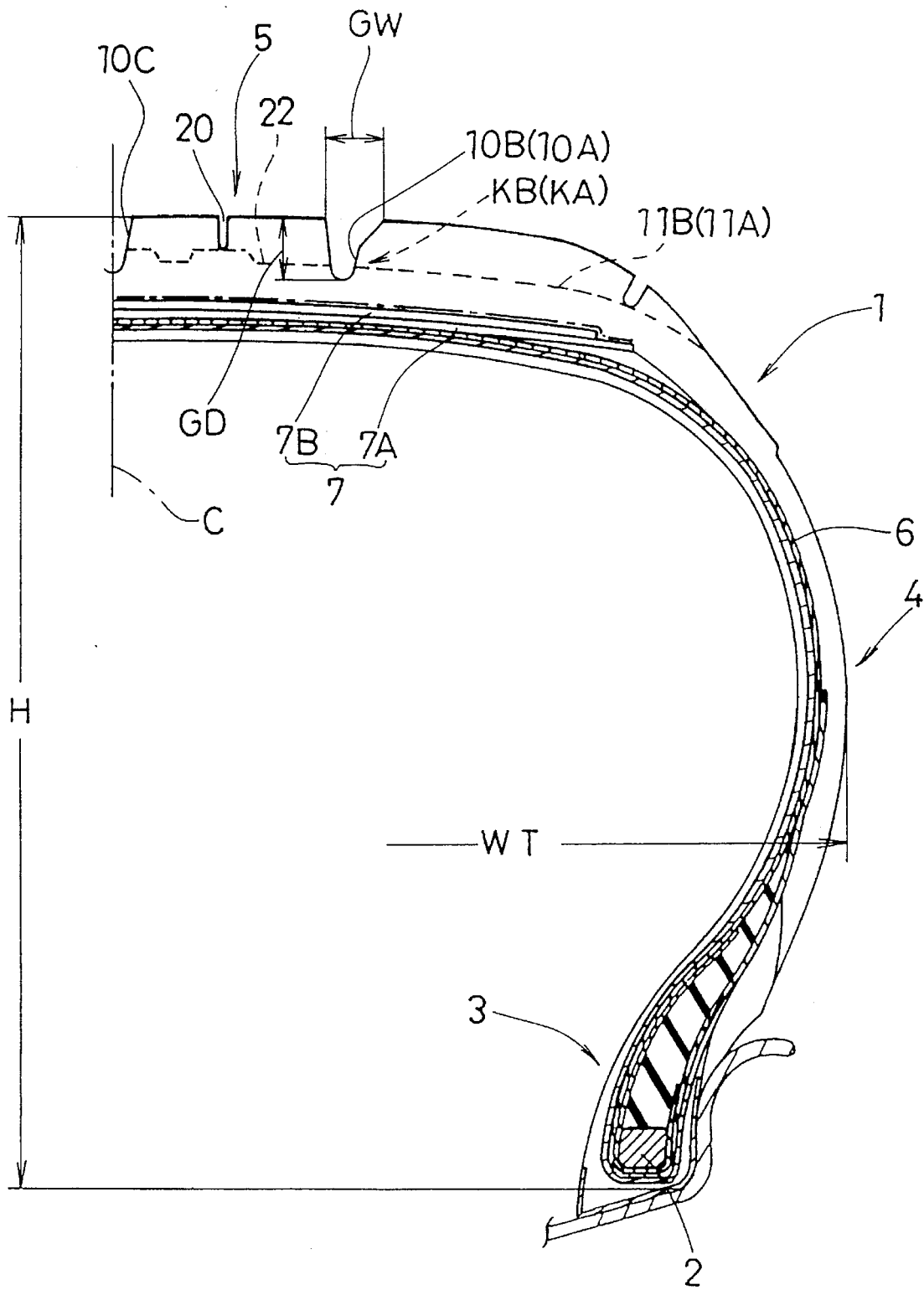
FIG. 1 is a cross sectional view of an embodiment of the present invention.
Figure 2:
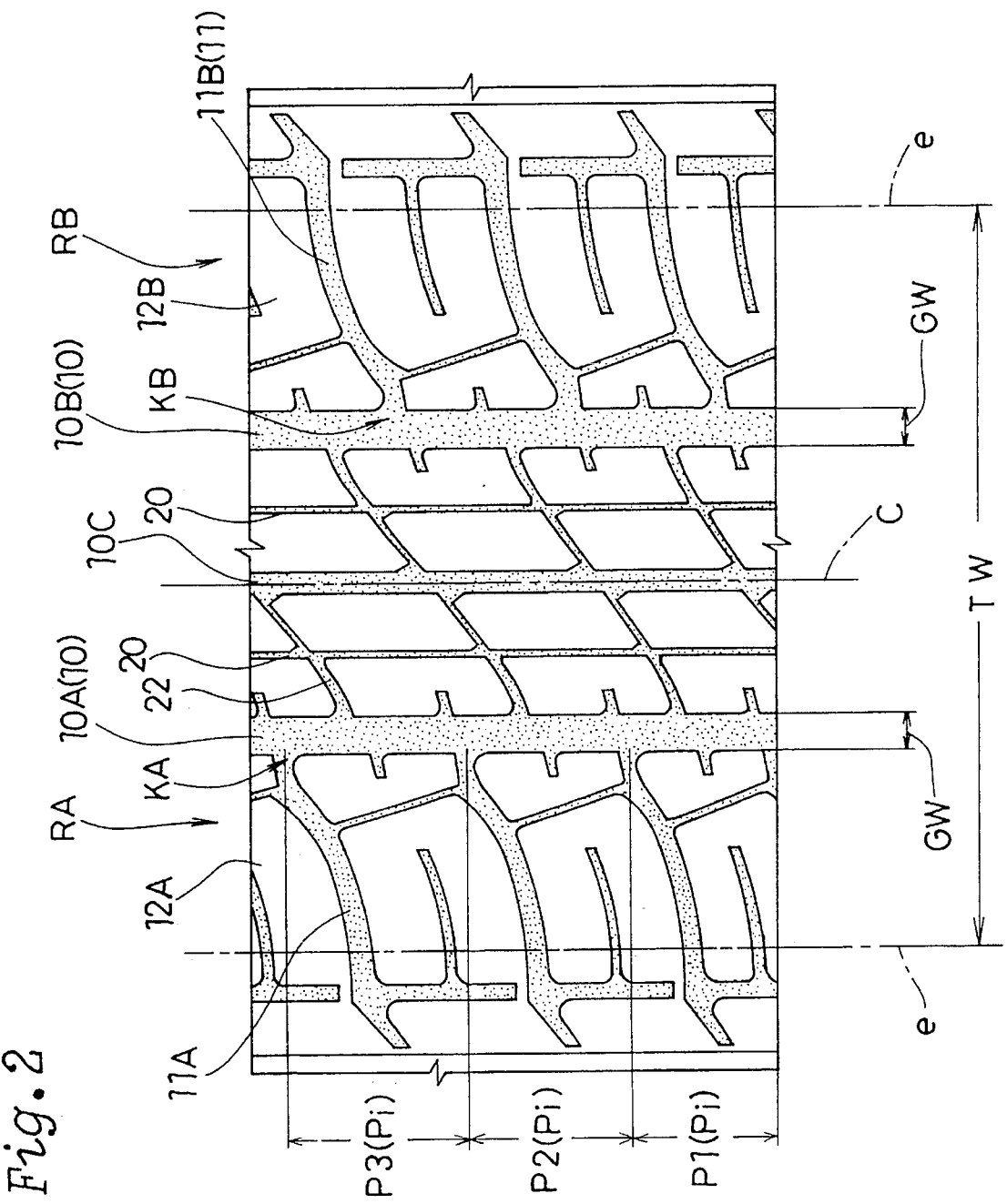
FIG. 2 is a developed view of the tread pattern thereof.

In FIGS. 1 and 2, the pneumatic tire 1 is a passenger car tire having an aspect ratio of not more than 75%. The tire aspect ratio is the ratio H/WT of the tire section height H to the the tire section width WT, The tire 1 comprises a tread portion 5, a pair of axially spaced bead portions 3, a pair of sidewall portions 4 extending between the tread edges and the bead portions 3, a pair of bead cores 2 disposed one in each of the bead portions 3, a carcass 6 extending between the bead portions 3 through the tread portion 5 and sidewall portions 4, and a stiff belt 7 disposed radially outside the carcass 6 and inside a rubber tread.

The carcass 6 is composed of at least one ply of cords arranged at an angle of from 60 to 90 degrees with respect to the tire equator C to have a radial or semiradial structure and turned up around the bead cores 2 from the inside to outside of the tire.

For the carcass cords, organic fiber cords, e.g. polyester, nylon, rayon and the like and steel cords can be used.

The belt 7 comprises at least one ply in this embodiment, two cross breaker plies 6A and 6B of parallel cords laid an angle of not more than 30 degrees with respect to the tire equator C. The belt cords are laid parallel with each other in each ply 6A, 6B, but crosswise between the plies.

For the belt cords, metal cords such as steel cords and organic fiber cords, e.g. polyester, nylon, rayon and the like can be used.

The tread portion 5 is provided with a block pattern or block-rib pattern. In this embodiment, as shown in FIG. 2, a block pattern is provided.

Here, a rib is a circumferentially continuous tread element, and therefore, a block-rib pattern consists of at least one circumferentially continuous element and a plurality of circumferentially discontinuous elements, and a block pattern consists of only a plurality of circumferentially discontinuous elements.

The tread portion 5 is provided with a pair of main grooves 10A and 10B and lateral grooves 11A and 11B intersecting the main grooves.

Each of the main grooves 10A and 10B is a straight groove extending continuously in the circumferential direction of the tire and disposed on each side of the tire equator C.

The lateral grooves 11A extend from the main groove 10A to the adjacent tread edge (e) at an angle of less than 45 degrees with respect to the axial direction of the tire to define a row RA of circumferentially spaced blocks 12A. The lateral grooves 11B extend from the main groove 10B to the adjacent tread edge (e) at an angle of less than 45 degrees to the axial direction of the tire to define a row RB of circumferentially spaced blocks 12B. Here, the tread edges (e) is the axial outermost edges E of the ground contacting region under such a condition that the tire is mounted on its standard rim and inflated to its standard pressure, and then loaded with a standard load.

In this embodiment, between the main grooves 10A and 10B, a circumferentially extending main groove 10C is disposed on the tire equator C, and further a circumferentially extending narrow groove 20 is disposed between the main groove 10C and each of the main grooves 10A and 10B. Furthermore, axially extending lateral grooves 22 are disposed between the main grooves 10A and 10B to divide this part into a plurality of blocks.

At the tread face, the main grooves 10A and 10B have a substantially constant width GW along the entire length thereof, and the width GW is not less than 3% of the tread width TW and not less than 5 mm.

Further, the main grooves 10A and 10B have a substantially constant depth GD along the entire length thereof.

In this embodiment, the lateral grooves 11A and 11B are arranged at irregular pitches, using three different pitches P1, P2 and P3, wherein P1<P2<P3. Here, the pitch is a circumferential distance between the groove centers of the adjacent lateral grooves at the intersections (KA, KB) with the main groove.

The pitch arrangement in the tire circumferential direction is such that the same pitch does not come to the next, for example

P1, P2, P3, P1, P2, P3, P1 . . . ,
P1, P2, P3, P2, P1, P2, P3 . . .

and the like.

In this embodiment, the sectional areas of the main grooves 10A and 10B are changed, using the pitches P1–P3 of the lateral grooves 11A and 11B axially outwardly adjacent to the the main grooves 10A and 10B as follows: the parts in the shortest pitches P1 have a smallest sectional area S1; parts in the middle pitches P2 have a middle sectional area S2; and the parts in the longest pitches P3 have a largest sectional area S3.

And these areas S1, S2 and S3 and pitches P1, P2 and P3 satisfy the following relationships:

$$(S2-S1)/S1 = 0.5 \text{ to } 1.5 \text{ times } (P2-P1)/P1 \text{ and}$$

$$(S3-S2)/S2 = 0.5 \text{ to } 1.5 \text{ times } (P3-P2)/P2,$$

wherein (P1<P2<P3) and (S1<S2<S3).

As explained above, the main grooves 10A and 10B have a constant depth GD and a constant width GW at the tread face or groove top. Therefore, in order to change the sectional area, slopes of the groove side walls 14 are changed and a protruding part is formed as shown in FIGS. 3, 4 and 5.

Figure 3:
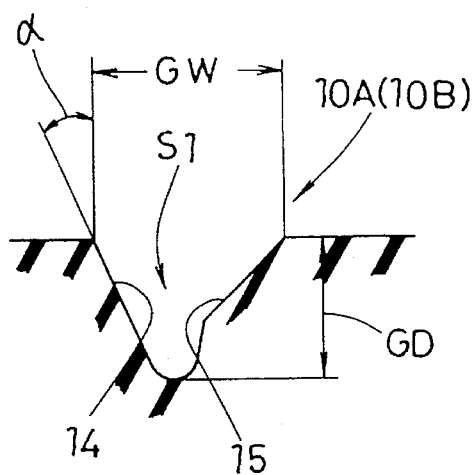
FIGS. 3, 4 and 5 are cross sectional views of the main groove.

FIG. 3 shows the cross section of the groove parts having the smallest sectional area S1, wherein one of the opposite groove side walls 14 is provided with a protrusion 15, whereby the cross sectional area S1 is decreased in comparison with S2.

Figure 4:
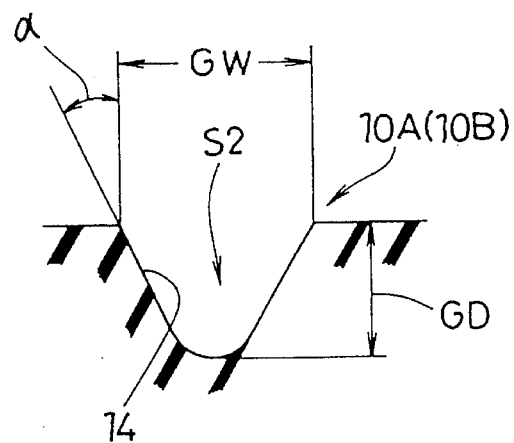

FIG. 4 shows the cross section of the parts having the middle sectional area S2.

Figure 5:
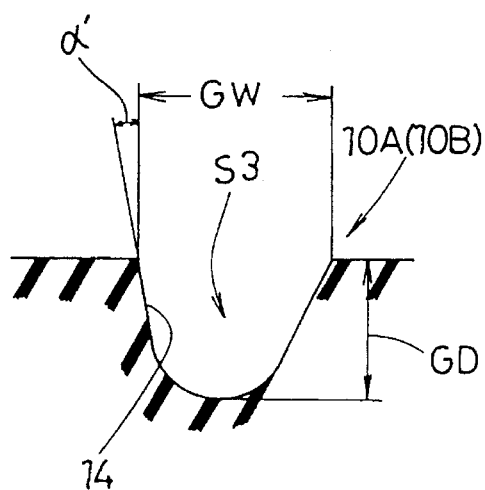

FIG. 5 shows the cross section of the parts having the largest sectional area S3, wherein one of the opposite groove side walls 14 is provided with an inclination (alpha dash) smaller than the inclination (alpha) in FIG. 4, whereby the cross sectional area S3 is increased in comparison with S2.

Such a change of the slope and provision of the protrusion are preferably made on the groove side wall 14 positioned on the same side as the lateral grooves defining the pitches. As a result, a block having a shorter pitch which is usually soft is provided with a larger support, and a block having a longer pitch which is usually stiff is provided with a less support. Therefore, vibration of the short block is decreased, and also the block rigidity is evened in the tire circumferential direction, which helps to decrease not only the vibration noise but also uneven wear of the blocks.

The above-mentioned main groove 10C extends straight and continuously in the circumferential direction, having a constant sectional area along its entire length. However, it is possible to change the cross sectional area according to the pitches of the lateral grooves 22 in the same way as explained above.

This invention can be applied to a tire having from only one main groove 10 to several main grooves 10 preferably one to five grooves, and all or part of the main grooves can be changed in the sectional area according to the pitches of lateral grooves extending therefrom toward one side thereof.

In such a case that there are a plurality of lateral grooves on both sides of a main groove 10 to be changed in its sectional area, the pitches to be used are preferably determined as follows.

I) When the lateral grooves on one side of the main groove are greater in width than the lateral grooves on the other side, the pitches of the wider lateral grooves are used.

II) When the lateral grooves on both sides have the same width, a) if the main groove is located on the tire equator, the pitches on either side can be used. b) If not, the pitches on the axially inner side are used.

However, in the above case II)-a), if the tire is directed to set in a vehicle such that a particular side thereof places on the outside of the vehicle, the pitches to be placed on the outside of the vehicle are preferably used. Further, if lateral grooves having different widths are provided on one side of the main groove, the widest lateral grooves are used in the above-mentioned determination.

As known from the above-explanation, it is possible that the numbers of different pitches are differed from each other between different main grooves in a tread portion.

Using the pitches determined as above, the sectional area of the main groove is changed to satisfy the following relationship. Given that:

the number of the different pitches is n (n>1);
pitch P(i)<pitch P(i+1) (i=1 to n−1);
the groove sectional area in pitch P(i) is S(i); and
the sectional area in pitch P(i+1) is S(i+1), the rate of the sectional area increase $$\{S(i+1)-S(i)\}/S(i)$$

is 0.5 to 1.5 times the rate of the pitch increase $$\{P(i+1)-P(i)\}/P(i).$$

When the sectional area increase rate is less than 0.5 times the pitch increase rate, the prevention of the air resonance is insufficient. When the sectional area increase rate is more than 1.5 times the pitch increase rate, the uniformity of the tire is disturbed. Further, the appearance of the tire when tread wear is progressed becomes bad, and the molding is difficult.

Test tires of size 205/65R15 having the internal structure shown in FIG. 1 and the same tread pattern shown in FIG. 2 were prepared and their running noise was measured.

In the example tire, the sectional area of the main grooves 10A and 10B were changed. In the reference tire, the sectional area of the main grooves 10A and 10B were not changed. The specifications are given in Table 1.

The running noise was measured according to the "Test Procedure for Tire Noise" specified in Japanese JASO-C606. The test tires mounted on a standard rim (size 6½JJX15) and inflated to a standard inner pressure of 2.0 ksc were provided on a 3000 cc passenger car. Then the test car was coasted on a asphalt road at a speed of 52.5 km/h, and the maximum noise sound pressure level in dB(A) was measured with a microphone set at 1.2 meter height from the road surface and 7.5 meter sideways from the running center line.

Figure 6:
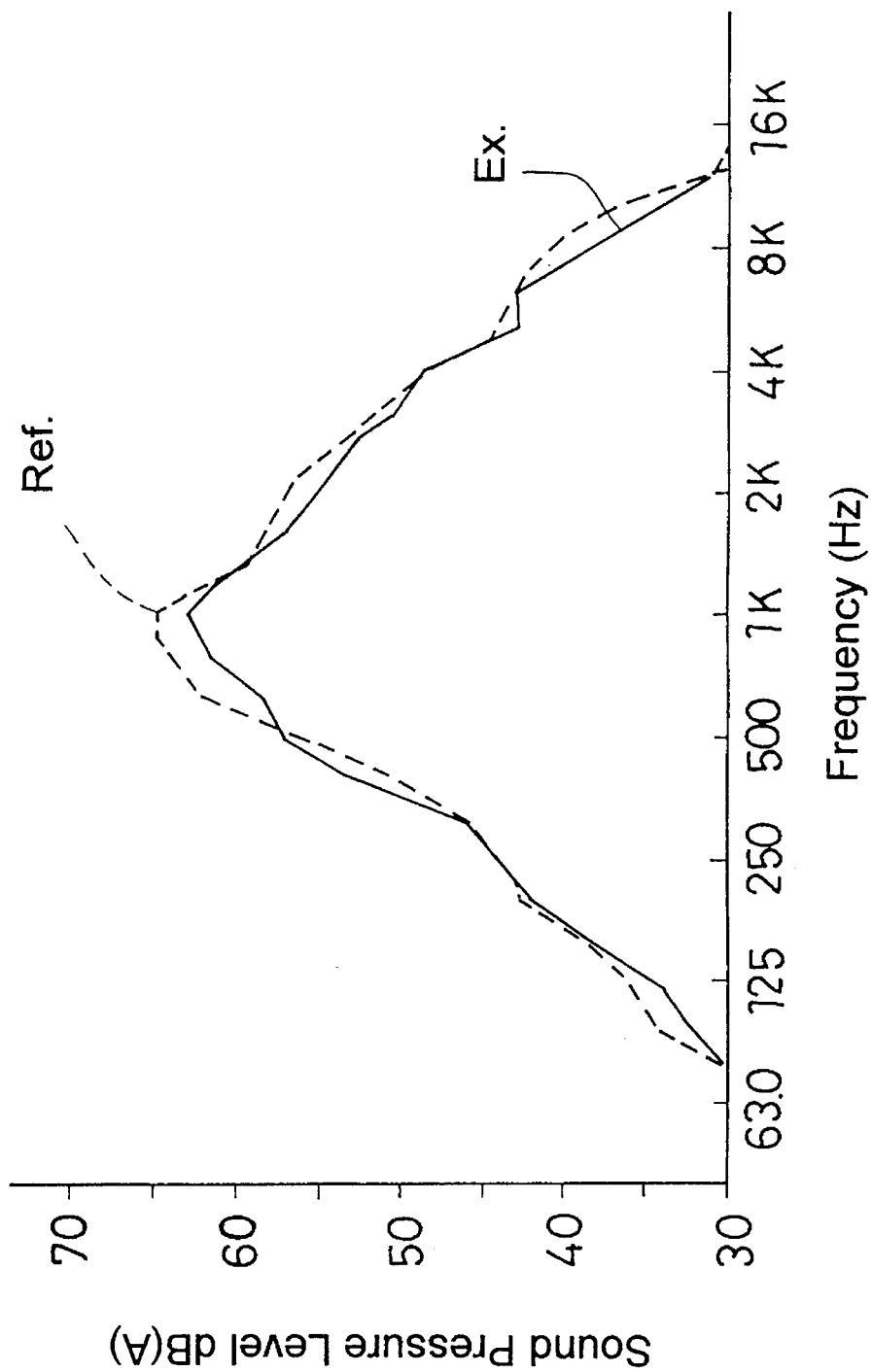
FIG. 6 is a graph showing the results of noise test.

The test results are shown in FIG. 6, wherein the sound pressure level was decreased over a wide frequency range (about 2.5 dB at the peak) and therefore the power was remarkably decreased. Through the tests, it was confirmed that, in the tire according to the present invention, the air resonance is prevented and the running noise is effectively reduced.

The present invention can be suitably applied to a passenger tire to reduce the running noise.

TABLE 1

| Tire<br>Tread pattern | Ex.<br>FIG. 2 | Ref.<br>FIG. 2 |
| --- | --- | --- |
| Lateral groove | | |
| Number of diff. pitches (n) | 3 | 3 |
| Pitch (index) | | |
| P1 | 85 | 85 |
| P2 | 100 | 100 |
| P3 | 115 | 115 |
| Main groove | | |
| Width GW (mm) | 12.0 | 12.0 |
| Depth GD (mm) | 8.4 | 8.4 |
| Sectional area (index) | | |
| S1 | 84 | 117 |
| S2 | 100 | 117 |
| S3 | 117 | 117 |
| Increase Rate | | |
| (S2−S1)/S1 | 0.19 | 0 |
| (P2−P1)/P1 | 0.18 | 0.18 |
| (S3−S2)/S2 | 0.17 | 0 |
| (P3−P2)/P2 | 0.15 | 0.15 |

I claim:

1. A pneumatic tire comprising a tread portion, said tread portion provided with a main groove extending continuously in the circumferential direction of the tire and having a depth that is substantially constant along its length; and circumferentially spaced lateral grooves each extending axially from the main groove on one side of the main groove, wherein each lateral groove intersects the main groove such that pitches between the intersections of the lateral grooves with the main groove are defined, the pitches including at least two different pitches, the width of the main groove at the groove top being substantially constant along its length, but the sectional area of the main groove being changed along its length such that $$\{S(i+1)-S(i)\}/S(i)$$

is 0.5 to 1.5 times $$\{P(i+1)-P(i)\}/P(i)$$

wherein

S(i) is the sectional area of the main groove in one pitch P(i) and

S(i+1) is the sectional area of the main groove in the next longer pitch P(i+1).

2. The pneumatic tire according to claim 1, wherein the tread portion is provided with a plurality sets of said main groove and lateral grooves.

3. The pneumatic tire according to claim 1, wherein said at least two different pitches include a short pitch, a middle pitch and a long pitch, and the main groove has first and second sidewalls, said first sidewall being located on the same side of the main groove as the lateral grooves which define the pitches, and wherein the first side wall in the middle pitch is inclined at an angle $\alpha$ with respect to a radial direction, the first sidewall in the long pitch is inclined at an angle $\alpha'$, and the angle $\alpha'$ is smaller than the angle $\alpha$.

4. The pneumatic tire according to claim 1, wherein said at least two different pitches include a short pitch, and wherein the main groove has first and second sidewalls, said second sidewall being provided with a protrusion in the short pitch.

* * * * *